Nov. 9, 1937.  E. CREECH  2,098,860
HARVESTER ATTACHMENT FOR TRACTORS
Filed Jan. 16, 1937  2 Sheets-Sheet 1
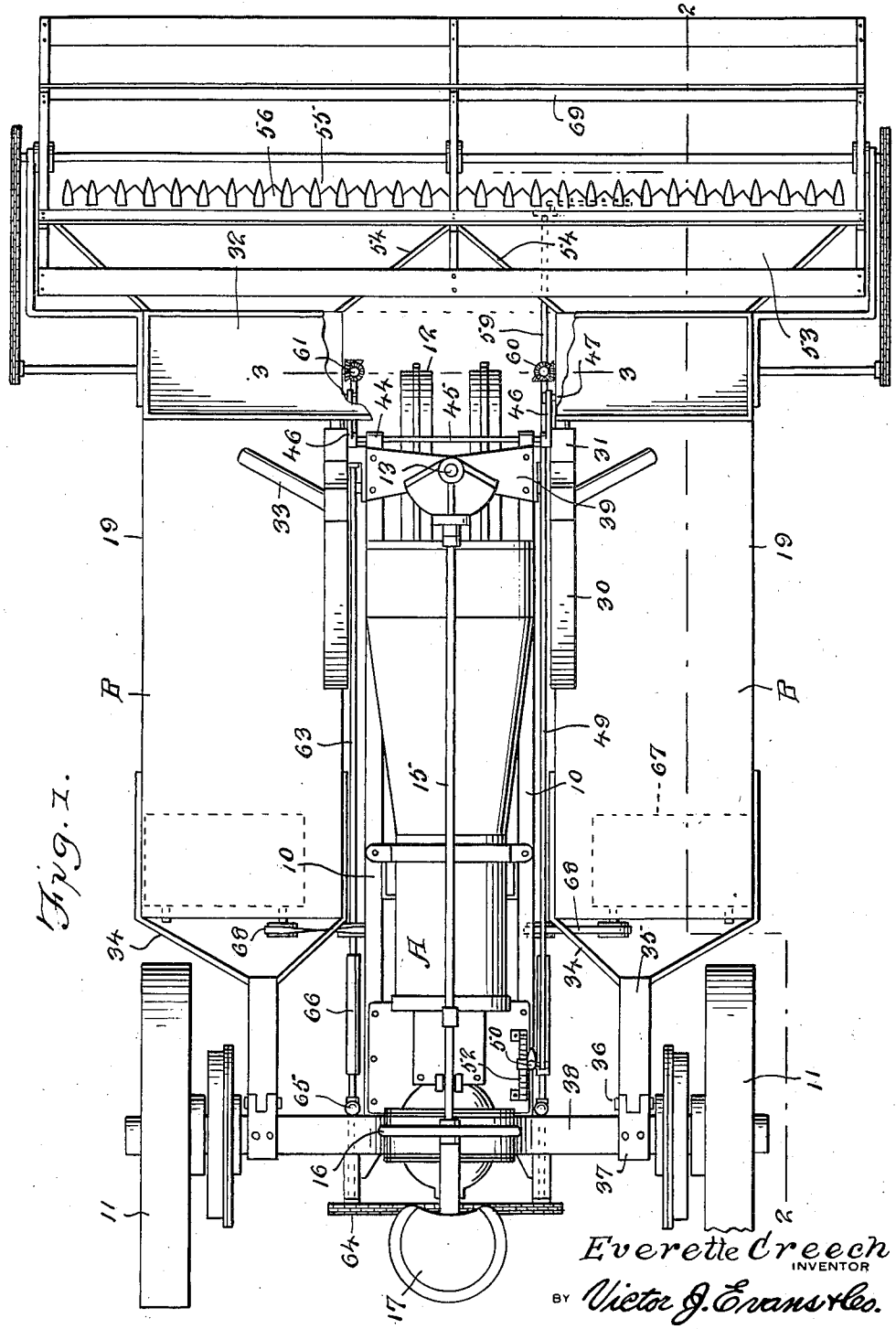

Nov. 9, 1937.   E. CREECH   2,098,860
HARVESTER ATTACHMENT FOR TRACTORS
Filed Jan. 16, 1937   2 Sheets-Sheet 2
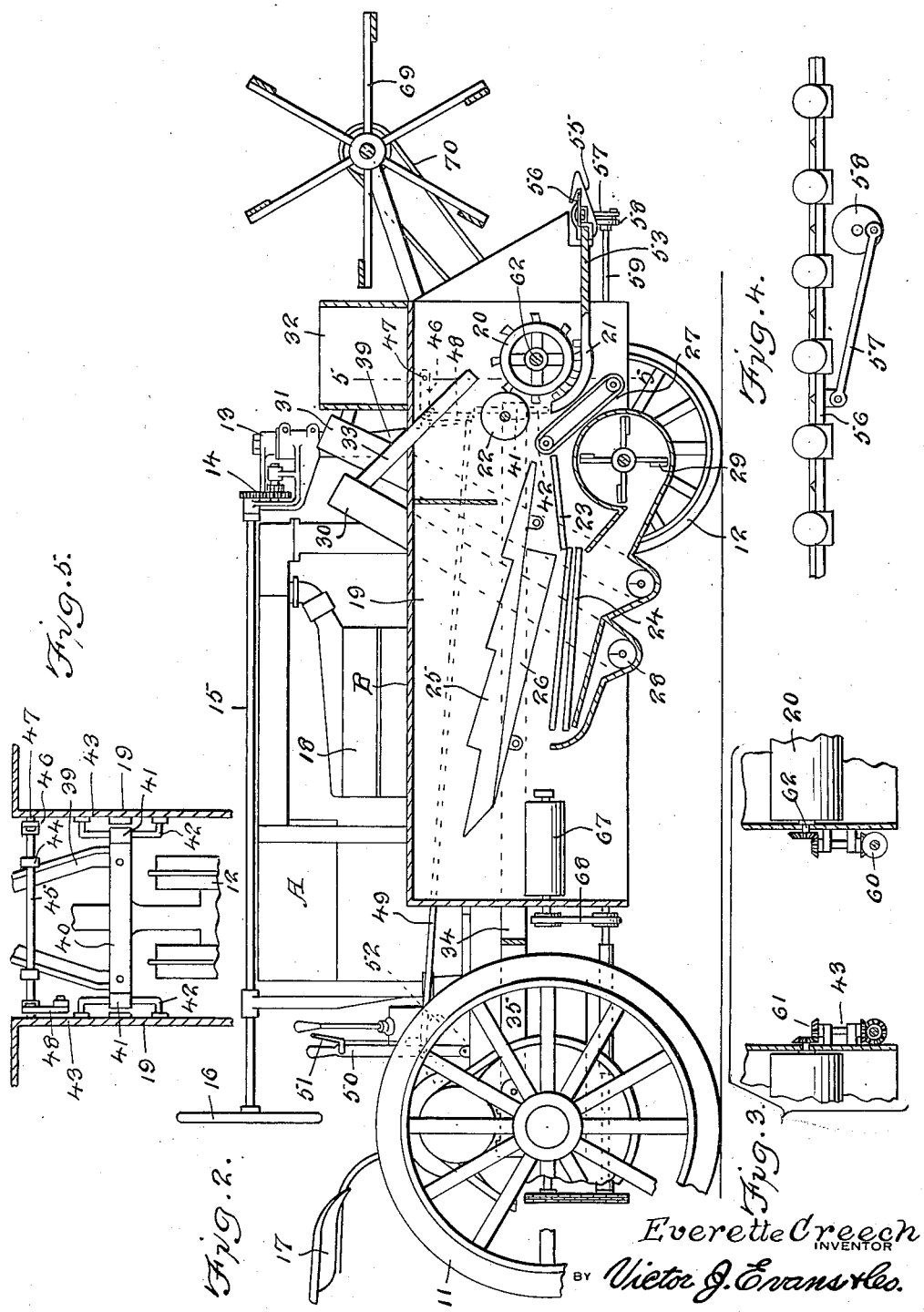
Everette Creech
INVENTOR
BY Victor J. Evans & Co.
ATTORNEY Patented Nov. 9, 1937

2,098,860

UNITED STATES PATENT OFFICE 2,098,860

HARVESTER ATTACHMENT FOR TRACTORS

Everette Creech, Camden, Ohio

Application January 16, 1937, Serial No. 120,995

5 Claims. (Cl. 56—21)

The invention relates to a dual combine and more especially to a harvester attachment for tractors.

The primary object of the invention is the provision of an attachment of this character, wherein a combine including two units is supported and operated at opposite sides of a tractor and each unit comprising a cylinder, concave, riddles, fan, grain auger and straw distributing conveyor, respectively, the two units being arranged at opposite sides of the tractor and extend from the front to the rear of the same, a single reel and a single sickle being provided for both units and a divider is supported between the cylinders of the units for causing the grain cut in the direct path of the tractor to be directed into the cylinders when the tractor is advanced.

Another object of the invention is the provision of an attachment of this character, wherein each combine unit is provided with a shaft for operating its cylinder, concave, auger, fan and conveyor and one of these shafts is extended and connected to the sickle so that these parts will be operated directly from the tractor, the engine thereof being the power unit.

A further object of the invention is the provision of an attachment of this character, wherein the units providing the dual combine are readily and easily mounted upon and operated by a tractor without requiring any change or alteration in the make-up of the latter.

A still further object of the invention is the provision of an attachment of this character, which is comparatively simple in construction, thoroughly reliable and effective in its operation, readily and conveniently associated with a tractor and comparatively inexpensive to manufacture and install.

With these and other objects in view, the invention consists in the features of construction, combination and arrangement of parts as will be hereinafter more fully described illustrated in the accompanying drawings, which disclose the preferred embodiment of the invention and pointed out in the claims hereunto appended.

In the accompanying drawings:

Figure 1 is a top plan view of the attachment constructed in accordance with the invention shown applied to the tractor and partly in section.

Figure 2 is a sectional view on the line 2—2 of Figure 1.

Figure 3 is a fragmentary sectional view on the line 3—3 of Figure 1.

Figure 4 is a fragmentary sectional view on the line 4—4 of Figure 1.

Figure 5 is a fragmentary sectional view on the line 5—5 of Figure 2.

Similar reference characters indicate corresponding parts throughout the several views in the drawings.

Referring to the drawings in detail, A designates generally a tractor of standard construction and B each of the combine units associated therewith and constituting the attachment as will be hereinafter fully described.

The tractor A as is usual comprises a chassis 10 which at the rear thereof has the rear drive wheels 11 while at the front are the forward steering wheels 12, these being turned for the guiding of the tractor, the steering post 13 for said wheels 12 being operated through suitable steering mechanism 14 including a rearwardly directed steering shaft 15 having at its rear end a steering wheel 16 which is located conveniently for an operator when occupying the seat 17 of the tractor. Supported on the chassis 10 is the internal combustion engine 18 which through suitable transmission and differential mechanisms (not shown) furnishes power to the rear wheels 11 of the tractor for the driving of the same.

Arranged at opposite sides of the chassis 10 of the tractor are the combine units B each including a casing 19 having therein a thresher cylinder 20, a concave 21, the cylinder beater 22, the grain pan 23, shoe sieves 24, the straw rack risers 25, associated troughs 26, the conveyor 27, the grain augers 28, the shoe fan 29 and the grain elevators 30 and 31, respectively, the latter elevator 31 being in communication with a grain bin, trough or the like 32 while the elevator 30 functions as a tailings elevator and through the spout 33 delivers the tailings to the thresher cylinder as is usual.

These casings 19 at their rear ends are fixed in yokes 34 formed at the forward ends of arms 35 hinged at 36 to couplings 37 fixed to the rear axle housing 38 of the tractor so that the said casings 19 can swing vertically under adjustment thereof in a manner presently described.

The front upstanding supports 39 of the chassis 10 of the tractor for the steering post 13 have fixed thereto a cross head 40 formed with terminal guide ways 41 in which are slidably engaged guide loops 42 fixed to the inner vertical sides 43 of the casings 19. On the supports 39 above the cross head 40 are bearings 44 in which is journaled a crank shaft 45 having the cranks 46 pivoted at 47 to the sides 43 of the casings 19 so that on rotation of the shaft these casings will be raised and lowered. One of the cranks 46 has joined with it a throw arm 48 to which is pivoted a throw rod 49 also pivoted to a hand lever 50 carrying a releasable latching device 51 coacting with a keeper segment 52 suitably fixed to the tractor and thus by operation of the lever 50 the casings 19 can be readily raised and lowered, this lever 50 being conveniently located for an operator of the tractor.

Arranged at the fronts of the casings 19 are the platforms 53 which are horizontally disposed and lead to the concaves 21 within these casings 19, there being a divider 54 between these platforms 53 for directing cut material to each thresher cylinder 20 and avoiding the passage of the cut material to the tractor centrally located between the combines B while at the forward edges of the platforms 53 and disposed crosswise with respect to the tractor A is a sickle 55, its cutter bar 56 being reciprocated through a pitman 57 pivoted thereto and also pivoted to an eccentric 58 fixed to a driven shaft 59 which through a gear connection 60 in association with gearings 61 to the axles 62 of the cylinders 20 will be operated. The gearings 61 are operated from shafts 63 having chain and sprocket connections 64 with the engine 18 of the tractor, the said shafts 63 being equipped with the universal and slip joints 65 and 66, respectively, to avoid interference in the driven connections on the raising and lowering of the combines B which are raised and lowered in unison with each other when the lever 50 is actuated and in this manner regulating the height of the sickle 55 with respect to the material growing in a field.

Within each casing 19 and included as a part of each combine unit B is the usual straw conveyor 67 and these conveyors 67 through the connections 68 with the shafts 63 will be driven while the other moving parts in the combine units will be operated from power furnished by the tractor in any suitable manner.

Above the sickle 55 and the platform 53 is a reel 69 having the driven connections 70 with the axles 62 of the thresher cylinders 20, the reel 69 being of conventional type.

In the operation of the tractor as fast as the grain is cut it falls upon the platform 53 and is fed to the thresher cylinders 20. The grain passes between the cylinders 20 and concaves 21 where the greater portion of separation takes place and is then carried on the conveyor to the grain pan. As the grain pan is vibrated, the grain flows down until it reaches the shoe sieves where a blast of air from the shoe fan carries away the chaff and the grain falls through the sieves upon one of the chutes and runs down into its grain auger. The threshed grain is carried by this grain auger into the lower end of the grain elevator and elevated and distributed over the recleaner sieves by the second grain auger. Here it receives a blast of air from the recleaner fan. The clean grain falls through the recleaner sieves and runs down into another grain auger which carries it out into the elevator 31 and disposes it in the bin or trough 32, the straw separated from the grain being carried off by the straw conveyors 67 and disposed onto the ground.

The respective combine units B are of the usual well known construction excepting that the platform canvas and lower elevator canvas as is common in a harvester are eliminated.

What is claimed is:

1. A harvester attachment for tractors having a body frame provided with front and rear wheels and a power unit upon said frame, comprising combine units arranged at opposite sides of said frame forwardly of the rear wheels, means connecting the units with the tractor for vertical movement, a sickle forwardly of the units and carried thereby, and means above the sickle for directing material cut thereby rearwardly in the direction of the said units.

2. A harvester attachment for tractors having a body frame provided with front and rear wheels and a power unit upon said frame, comprising combine units arranged at opposite sides of said frame forwardly of the rear wheels, means connecting the units with the tractor for vertical movement, a sickle forwardly of the units and carried thereby, means above the sickle for directing material cut thereby rearwardly in the direction of the said units, and means on the tractor and operative upon the units for the raising and lowering of the same together.

3. A harvester attachment for tractors having a body frame provided with front and rear wheels and a power unit upon said frame, comprising combine units arranged at opposite sides of said frame forwardly of the rear wheels, means connecting the units with the tractor for vertical movement, a sickle forwardly of the units and carried thereby, means above the sickle for directing material cut thereby rearwardly in the direction of the said units, means on the tractor and operative upon the units for the raising and lowering of the same together, and means operated by the power unit of the tractor for actuating the said combine units and the sickle.

4. A harvester attachment for tractors having a body frame provided with front and rear wheels and a power unit upon said frame, comprising combine units arranged at opposite sides of said frame forwardly of the rear wheels, means connecting the units with the tractor for vertical movement, a sickle forwardly of the units and carried thereby, means above the sickle for directing material cut thereby rearwardly in the direction of the said units, means on the tractor and operative upon the units for the raising and lowering of the same together, means operated by the power unit of the tractor for actuating the said combine units and the sickle, and a platform between the sickle and the forward ends of said combine units for receiving material cut by the sickle.

5. A harvester attachment for tractors having a body frame provided with front and rear wheels and a power unit upon said frame, comprising combine units arranged at opposite sides of said frame forwardly of the rear wheels, means connecting the units with the tractor for vertical movement, a sickle forwardly of the units and carried thereby, means above the sickle for directing material cut thereby rearwardly in the direction of the said units, means on the tractor and operative upon the units for the raising and lowering of the same together, means operated by the power unit of the tractor for actuating the said combine units and the sickle, a platform between the sickle and the forward ends of said combine units for receiving material cut by the sickle, and a divider between the units at their forward ends on the platform for directing material cut by the sickle to the respective combine units and avoiding the passage of such cut material onto the tractor.

EVERETTE CREECH.